United States Patent
Crow

[11] 3,994,559
[45] Nov. 30, 197

[54] BIDIRECTIONAL GUIDED MODE OPTICAL FILM-FIBER COUPLER

[75] Inventor: John David Crow, Mohegan Lake, N.Y.; Eric Gung-Hwa Lean, Mahopac, N.Y.

[73] Assignee: International Business Machines Corporation, Armonk, N.Y.

[22] Filed: Dec. 22, 1975

[21] Appl. No.: 642,861

[52] U.S. Cl. .................... 350/96 C; 350/96 WG
[51] Int. Cl.² ........................................ G02B 5/14
[58] Field of Search .................. 350/96 C, 96 WG

[56] References Cited
UNITED STATES PATENTS

| | | | |
|---|---|---|---|
| 3,774,987 | 11/1923 | Boivin | 350/96 WG |
| 3,791,715 | 2/1974 | Lean et al. | 350/96 WG |
| 3,864,019 | 2/1975 | Smolinsky et al. | 350/96 C |
| 3,871,742 | 3/1975 | Kaminow et al. | 350/96 |
| 3,948,583 | 4/1976 | Tien | 350/96 |

*Primary Examiner*—John K. Corbin
*Assistant Examiner*—Stewart Levy
*Attorney, Agent, or Firm*—Robert E. Sandt

[57] ABSTRACT

An optical structure for the bidirectional coupling light between each of a multiplicity of optical fibe and corresponding individual thin-film waveguides achieve a leaky wave coupling from one guided mo structure to a second guided mode structure. T structure is particularly suited for fabrication by pl nar deposition and etching techniques and features t precise axial alignment of the optical elements by i serting the fibers in etched V-grooves in the substra upon which are deposited the waveguides.

6 Claims, 3 Drawing Figures

BIDIRECTIONAL GUIDED MODE OPTICAL FILM-FIBER COUPLER

BACKGROUND OF THE INVENTION

1. Field of the Invention

The present invention relates to the field of optics and, more particularly, to optical couplers for bidirectionally coupling optical radiation between a fiber optic waveguide and a thin-film waveguide.

2. Prior Art

Prior art devices for coupling optical radiation between an optical fiber and a thin-film waveguide are shown in the following patents: U.S. Pat. No. 3,791,715 issued Feb. 12, 1974 to E. G. Lean et al. and assigned to the instant assignee; U.S. Pat. No. 3,774,987 issued Nov. 27, 1973 to L. P. Boivan and assigned to Bell Canada -Northern Electric Research Limited; and U.S. Pat. No. 3,864,019 issued Feb. 4, 1975 to G. Smolinsky et al and assigned to Bell Telephone Laboratories, Inc.

In the Lean et al patent, light in a fiber optic is coupled into a thin-film waveguide through use of resonant cavity and a selectively producible grating between the cavity and the thin-film waveguide. The coupling is unidirectional, viz., from fiber to waveguide and employs the resonant cavity.

In the Boivan et al patent, the optical fiber is axially aligned with the thin-film waveguide by mounting it in a crystalographically etched V-groove in the substrate, upon which is deposited a thin-film waveguide. Coupling is from the waveguide to the fiber through air.

The patent to Smolinsky et al provides bidirectional coupling between a thinfilm waveguide and an optical fiber by inserting the fiber into a drilled hole in the substrate with a filler material added to form a hemispherical lens. The light in the substrate, whether it comes from the film waveguide or the optical fiber, is essentially unguided and subject to critical geometric relativities, as well as being difficult to fabricate.

The instant invention, unlike Smolinsky et al, provides complete guided mode structures in the waveguide, the optical fiber, and in the coupling region per se. Smolinsky et al. couple with unguided light in the substrate with a potential prejudice to the coupling efficiency. High coupling efficiency is possible only with angle or low mode number guides. The leaky wave coupling and the complete guided mode coupling of the instant invention provide high efficiencies even with multi-mode guides.

SUMMARY OF THE INVENTION

An object of the present invention is to provide a coupler for optical guided waves wherein an optical fiber and a thin-film optical waveguide are coupled for the bidirectional transmission of optical radiation by means of complete guided mode structural instrumentalities.

Another object is to provide an optical coupler which provides leaky wave coupling between a plurality of different guided mode structures for the bidirectional transmission of optical radiation therebetween.

A further object is to provide a coupling structure in accordance with the foregoing objects wherein the optical fiber is mounted within a V-groove in the coupler substrate, the V-groove being filled with an optical material and overlaid with a thin-film waveguide to provide a bidirectional leaky waveguided mode coupling between the fiber and the waveguide.

The foregoing and other objects of the present invention will be apparent from the more particular description of the preferred embodiment of the invention, illustrated in the accompanying drawings.

DESCRIPTION OF THE PREFERRED EMBODIMENT

It will be appreciated by those skilled in the art th it is extremely difficult to present an accurate scal representation of thin-film optical elements. Necessa ily, some elements must be exaggerated for clarity.

Figure 1:
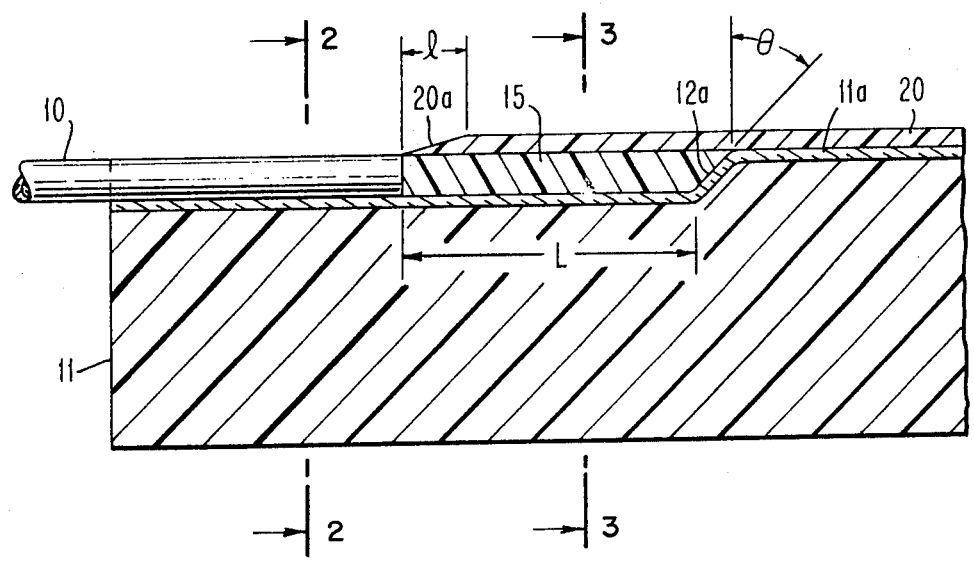
FIG. 1 is a sectional view taken on the axis of o fiber and waveguide.
Figure 2:
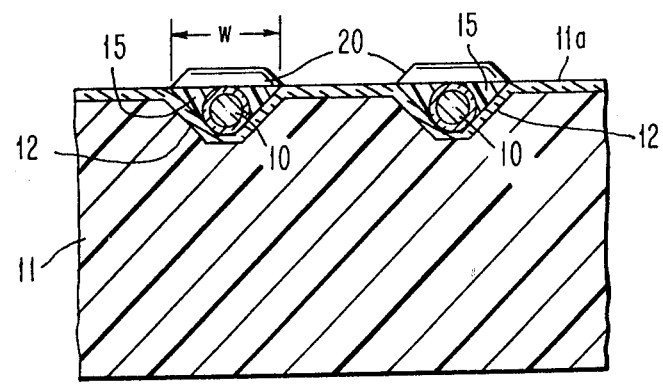
FIG. 2 is a transverse section taken along the li 2—2 in FIG. 1.
Figure 3:
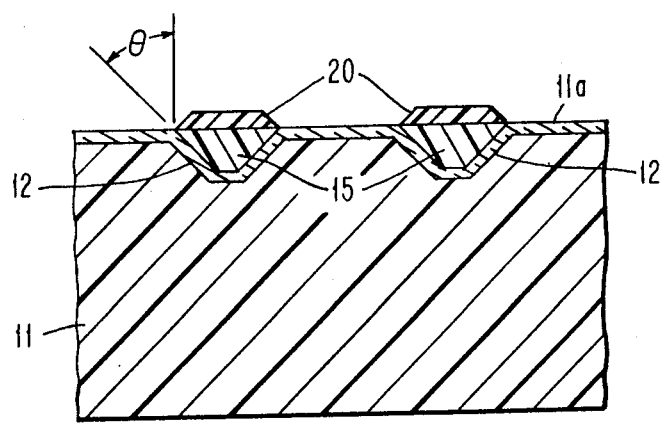
FIG. 3 is a transverse section taken along the li 3—3 in FIG. 1.

The invention is best illustrated in FIG. 1 wherein t optical fiber 10 is shown coupled to the thin-film wav guide 20 by means of the coupling region 15, the axis the fiber 10 and waveguide 20 being parallel but offs To achieve the coupling and the requisite alignment If the index of refraction of the fiber core is $n_1$, th of the filler material $n_2$, and that of the waveguide then the relationship $n_3 > n_2 \geq n_1$ must be preserve The greater $\nabla n = n_3 - n_2$, the more efficient the co pling, and the shorter the length of the coupling regi 15.

Typical device parameters are as follows:
- Fiber core diameter — 35$\mu$m
- O.D. of fiber (including cladding) — 50$\mu$m
- Index of refraction of fiber core — 1.5
- Width of groove in substrate — 125$\mu$m
- Angle of groove in substrate — 70°
- Length of fiber in groove — 35$\mu$m
- Distance of L in FIG. 1 - 10 × $l$
- Slope of ramp 12a — 35°
- Index of refraction of filler material — >1.5; e.g. 1
- Index of refraction of waveguide — >filler; e.g. 2
- Thickness of waveguide — 10$\mu$m
- Taper $l$ of waveguide — 100–1000 × thickness
- Width of wave guide — same as groove width To reduce insertion losses, the plastic filler mater 15 may be exposed to ultraviolet light or subjected chemical treatment to raise its index of refraction in t regions away from the bottom of the ramp and close the bottom of the groove. The UV light can be appli either from the silicon wafer of via the fiber itself. T step is, however, not essential to the operation of t device.

Also, the groove may be etched to completion form a v-shaped channel.

Operation

Light from the fiber couples into the plastic regi and the is drawn into the region 20 because $n_3 >$ The plastic region length $l$ is sufficiently long to allo substantial portion of the optical radiation to trans to the waveguide before the ramped portion of there is provided a silicon chip or substrate 11 i which a plurality of spaced parallel grooves 12 etched. These U-shaped grooves have a width equal $W = d(\sec\theta + \tan\theta)$ where $\theta$ equals the etch angle a $d$ equals the outside diameter of the opticl fiber, including the cladding. This relationship insures that the fiber is flush with the substrate surface. Typically, for an e angle of 35.5 and a 2 mil diameter optical fiber, the groove width will be approximately 5 mils. This, then, would be the minimum inter-channel spacing for fibers of this diameter. The groove depth would be slightly greater than the fiber outer diameter.

The grooves 12 have a tapered transition region wherein the apex of the groove slopes upward to the top surface of the substrate. The ramped portion 12a of the groove is also formed during the etching process. The slope has the same etch angle, e.g., 35.5 for Si wafers oriented <100>.

The layer 11a, to which reference has been made, acts as an optical buffer or cladding between the transition lightguide and substrate 11. It could be one of silicon dioxide obtained by oxidizing the silicon substrate, or a thin plastic coating of low index of refraction and optical loss. This layer coats the whole upper surface of the substrate including the V-grooves and ramped portions thereof.

The coupling region 15 is filled with a plastic or optical epoxy material after the optical fiber 10 is secured in its groove and then dressed flush with the top oxidized surface of the substrate. A thin film waveguide 20 is then deposited on top of the transition area and beyond as the application may dictate. The waveguide 20 has a tapered end 20a, tapering from the upper surface to nothing at the end of the optical fiber. The taper is a function of the difference between the indices of refraction of the waveguide material and the filler material in the coupling region 15, and is typically hundreds of wavelengths long to insure a smooth, low loss transition between waveguides. groove pushes the region $n_2$ into cutoff. In the reverse direction, light is forced from the planar waveguide 20 down into the plastic by the taper. Propagation of the radiation in the optical fiber 10 in the coupling region 15 and in the planar waveguide 20 is in guided modes in all three instances. This results in leaky wave coupling with control over the coupling by means of the taper in the substrate and in the waveguide. Leaky and tapered edge coupling can thus be extended to multi-mode guides while maintaining high efficiency.

The parallel offset coupling geometry, in addition to providing increased coupling efficiency, also provides a structure which can be readily fabricated by etching and deposition techniques. The grooves 12 may, for example, be fabricated by crystallographic etching, which by virtue of the preferential etching produces extremely accurate grooves and very precise control over the alignment. Thus, multi-channel devices may be readily and economically manufactured by mass fabrication techniques.

What has been described is a simple structure for optically coupling an optical fiber and planar waveguide for efficient bidirectional multi-mode radiation coupling. The structure provides efficient coupling, precise optical alignment, and can readily be fabricated by planar device technology.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An optical structure for bidirectionally coupling multimode optical radiation between an optical fiber and a thin-film waveguide comprising:

an optically transparent dielectric substrate having a U-shaped groove formed in one surface thereof and having a ramped portion sloping upward from the bottom of the groove to the surface of the substrate;

an optical fiber disposed within said groove with the end of the fiber spaced away from the ramped portion of said groove;

an optically transparent dielectric material filling said groove flush with the surface of said substrate;

a planar waveguide disposed on top of said material filling said groove at least coextensive therewith, the said waveguide having a tapered end tapering to nothing at the end of said fiber; and the index of refraction of said dielectric filler material being equal to or greater than the index of refraction of said optical fiber, and the index of refraction of said waveguide material being greater than that of said filler material, whereby the said dielectric filler material provides a guided mode transition region for the transfer of optical radiation between said fiber and said planar waveguide.

2. The apparatus of claim 1 wherein said substrate is composed of silicon.

3. The apparatus of claim 2 wherein the said silicon substrate is disposed with the (100) direction normal to the silicon surface and the (110) direction parallel to the desired axes of the U-grooves whereby the grooves may be fabricated by crystalographic etching.

4. The apparatus of claim 2 wherein said silicon substrate and grooves are provided with a layer of oxide.

5. The apparatus of claim 1 wherein said optical fiber is a clad fiber.

6. The apparatus of claim 1 wherein the U-groove has a depth dimension such that the optical fiber is flush with the surface of the substrate.

* * * * *